(12) United States Patent
Tanaka

(10) Patent No.: US 6,754,542 B1
(45) Date of Patent: Jun. 22, 2004

(54) CONTROL ARITHMETIC APPARATUS AND METHOD

(75) Inventor: Masato Tanaka, Tokyo (JP)

(73) Assignee: Yamatake Corporation, Tokyo (JP)

( * ) Notice: Subject to any disclaimer, the term of this patent is extended or adjusted under 35 U.S.C. 154(b) by 392 days.

(21) Appl. No.: 09/691,828

(22) Filed: Oct. 18, 2000

(30) Foreign Application Priority Data

Oct. 18, 1999 (JP) .......................................... 11-295041

(51) Int. Cl.$^7$ ........................................... G05B 13/02
(52) U.S. Cl. ............................ 700/42; 700/28; 700/37; 700/46; 700/52; 700/74; 700/89; 708/505; 708/523; 708/530; 714/6; 714/746; 714/751
(58) Field of Search ........................ 700/28, 37, 40–45, 700/89, 52, 53, 73, 74, 34, 46; 714/6, 746, 751; 708/7, 505, 501, 523, 530

(56) References Cited

U.S. PATENT DOCUMENTS

| | | | | |
|---|---|---|---|---|
| 5,043,862 A | * | 8/1991 | Takahashi et al. | ............ 700/42 |
| 5,043,863 A | * | 8/1991 | Bristol et al. | ................. 700/45 |
| 5,406,474 A | * | 4/1995 | Hansen | ......................... 700/37 |
| 5,412,584 A | | 5/1995 | Iwama et al. | ............... 702/140 |
| 5,463,993 A | | 11/1995 | Sanvido et al. | .......... 123/339.2 |
| 5,587,896 A | * | 12/1996 | Hansen et al. | ................ 700/28 |
| 6,094,601 A | * | 7/2000 | Popovich | ..................... 700/28 |
| 6,128,541 A | * | 10/2000 | Junk | ............................ 700/39 |
| 6,155,283 A | * | 12/2000 | Hansen et al. | .................. 137/1 |
| 6,360,131 B1 | * | 3/2002 | Cheng | .......................... 700/40 |
| 6,424,873 B1 | * | 7/2002 | Przybylski | ................... 700/42 |

FOREIGN PATENT DOCUMENTS

| | | |
|---|---|---|
| EP | 0 845 722 A | 3/1998 |
| EP | 0 875 887 A | 4/1998 |
| JP | 02-146838 | 6/1990 |
| JP | 4-039701 | 2/1992 |
| KR | 1998-024294 | 7/1998 |

* cited by examiner

*Primary Examiner*—Ramesh Patel
(74) *Attorney, Agent, or Firm*—Blakely, Sokoloff, Taylor & Zafman

(57) ABSTRACT

A control arithmetic device includes a subtracting section, disturbance application detecting section, error correction amount calculating section, error correction amount convergence calculating section, and control arithmetic section. The subtracting section calculates the error of a controlled variable on the basis of a controlled variable and set point for a controlled system. The disturbance application detecting section detects, in control cycles, on the basis of the error output whether a disturbance is applied. The error correction amount calculating section calculates an error correction amount on the basis of the magnitude of the error when application of a disturbance is detected. The error correction amount convergence calculating section performs a convergence operation. A control arithmetic method is also presented.

16 Claims, 6 Drawing Sheets

CONTROL ARITHMETIC APPARATUS AND METHOD

BACKGROUND OF THE INVENTION

The present invention relates to a control arithmetic apparatus for performing, for example, PID (Proportional, integrational and Differential) control or IMC (Internal Model Control) to calculate a manipulated variable on the basis of the error (deviation) between a set point and a controlled variable or the like and, more particularly, to a control arithmetic apparatus having the function of suppressing an overshoot accompanying the application of an disturbance and a control arithmetic method.

Conventionally, an apparatus using PID control is generally used as a versatile control arithmetic apparatus that can be used for an indefinite controlled system. As shown in FIG. 5, a conventional PID control arithmetic apparatus 10 is comprised of a host computer 11 for outputting an error Er by subtracting a controlled variable PV from an input set point SP and a control arithmetic section 12 for calculating a manipulated variable MV from the error Er output from the subtracting section 11 and outputting it to a controlled system 13.

Letting $C_{PID}$ be the transfer function of the control arithmetic section 12 and P be the transfer function of the controlled system 13, the manipulated variable MV is obtained from the transfer function $C_{PID}$ of the control arithmetic section 12 according to equation (1):

$$MV = C_{PID}(SP-PV) \quad (1)$$

The transfer function $C_{PID}$ can be expressed as $$C_{PID} = Kg\{1+(1/Tis)\}(1+Tds)/(1+\eta Tds) \quad (2)$$

where Kg is a proportional gain, Ti is the integration time, Td is the differentiation time, and η is the constant (e.g., η=0.2).

In this case, in controlling temperature and pressure, the transfer function P of the controlled system 13 can be approximated by equation (3):

$$P = Kp \exp(-Lps)/(1+Tps) \quad (3)$$

where Kp is the gain, Tp is the time constant, and Lp is the dead time. The gain Kp provides static characteristics for the controlled system 13; the time constant Tp, time delay characteristics (dynamic characteristics); and the dead time Lp, dead time characteristics (dynamic characteristics).

According to the known adjustment formula in a control theory or the known IMC theory proposed by M. Morari, in order to satisfy both stability and quick response of control, PID parameters (proportional gain Kg, integration time Ti, and differentiation time Td) are preferably given as follows:

$$Kg = \alpha Tp/(KpLp) \quad (4)$$

$$Ti = \beta Tp \quad (5)$$

$$Td = \gamma Lp \quad (6)$$

where α, β, and γ are constants (e.g., α=0.6, β=1, and γ=0.5). If PID parameters are set for the control arithmetic section 12, excellent control characteristics can be normally obtained.

According to the above conventional PID control arithmetic apparatus, in a steady state of temperature control, when a disturbance occurs, e.g., a temporary drop in temperature occurs, the manipulated variable MV is updated to restore the temperature. At the time of occurrence of a disturbance like a temporary drop in temperature, the temperature is automatically restored without updating the manipulated variable MV after a lapse of a relatively long period of time. In such a case, updating the controlled variable PV by using the PID control unit apparatus amounts to excessive manipulated variable correction. Consequently, as a phenomenon reflecting in the controlled variable PV, an excessive control response represented by an overshoot occurs, as shown in FIG. 6A.

As an example of a temporary drop in temperature as a disturbance, a phenomenon occurs, in which the temperature in a reaction furnace temporarily drops when a boat on which a plurality of semiconductor wafers are mounted is inserted into the reaction furnace in a batch type CVD (Chemical Vapor Deposition) furnace used for the manufacture of semiconductors. In the batch type CVD furnace shown in FIG. 7, reference numeral 61 denotes a boat, 62, a reaction furnace, 63-1 to 63-5, heaters for heating zones 1 to 5 in the reaction furnace 62; 64-1 to 64-5, sensors for measuring the temperatures (controlled variables PV) in the zones 1 to 5, and 65-1 to 65-5, PID control arithmetic apparatuses. The PID control arithmetic apparatuses 65-1 to 65-5 calculate the manipulated variables MV and output them to the heaters 63-1 to 63-5 to set the temperatures in the zones 1 to 5 to the temperature designated by the set point SP.

For temperature control in a semiconductor manufacturing process of forming a thin film by using a chemical reaction, an overshoot is a serious undesired phenomenon. Under the circumstances, a control arithmetic apparatus is disclosed in Japanese Patent Laid-Open No. 4-039701 (reference 1). This apparatus has the function of suppressing an overshoot by temporarily correcting the set point SP supplied to a PID control arithmetic section to a value near the controlled variable PV when a situation in which the controlled variable PV approaches the set point SP is detected, as shown in FIG. 8A.

The control arithmetic apparatus disclosed in reference 1 corrects the set point SP upon detection of a situation in which the controlled variable PV approaches the set point SP. For this purpose, the overshoot suppressing function is activated in the second half of last period in a series of controlled variable changes in the time interval between the instant at which the controlled variable PV deviates from the set point SP upon application of a disturbance and the instant at which the controlled variable PV is settled at a value near the set point. For this reason, at the time of occurrence of a disturbance for which the controlled variable PV changes at a high speed, like a temporary drop in temperature at the time of loading of a boat into the batch type CVD furnace, the overshoot suppressing function does not work for an excessive manipulated variable correction immediately after the application of a disturbance, which should be suppressed.

Consequently, as shown in FIGS. 8A and 9A, only a control result that does not differ much from that obtained by a general control arithmetic apparatus having no overshoot suppressing function can be obtained. That is, even if the overshoot suppressing function is activated upon detection of a situation in which the controlled variable PV approaches the set point SP, it is substantially too late to perform effective control. As described above, in the conventional control arithmetic apparatus, if a disturbance for which the controlled variable PV changes at high speed is applied, an overshoot cannot be suppressed.

SUMMARY OF THE INVENTION

It is an object of the present invention to provide a control arithmetic apparatus and method which can suppress an overshoot even if a disturbance for which the controlled variable changes at high speed is applied.

In order to achieve the above object, according to the present invention, there is provided a control arithmetic apparatus comprising first calculation means for calculating an error of a controlled variable on the basis of a controlled variable and set point for a controlled system, detection means for detecting, in control cycles, on the basis of the error output from the first calculation means whether a disturbance is applied, second calculation means for calculating an error correction amount on the basis of a magnitude of the error output from the first calculation means when application of a disturbance is detected, convergence operation means for performing convergence operation such that the error correction amount output from the error correction amount calculation means gradually converges to 0, and control arithmetic means for calculating a manipulated variable on the basis of the error output from the first calculation means and an error correction amount after the convergence operation which is output from the convergence operation means.

DESCRIPTION OF THE PREFERRED EMBODIMENT

The present invention will be described in detail below with reference to the accompanying drawings.

Figure 1:
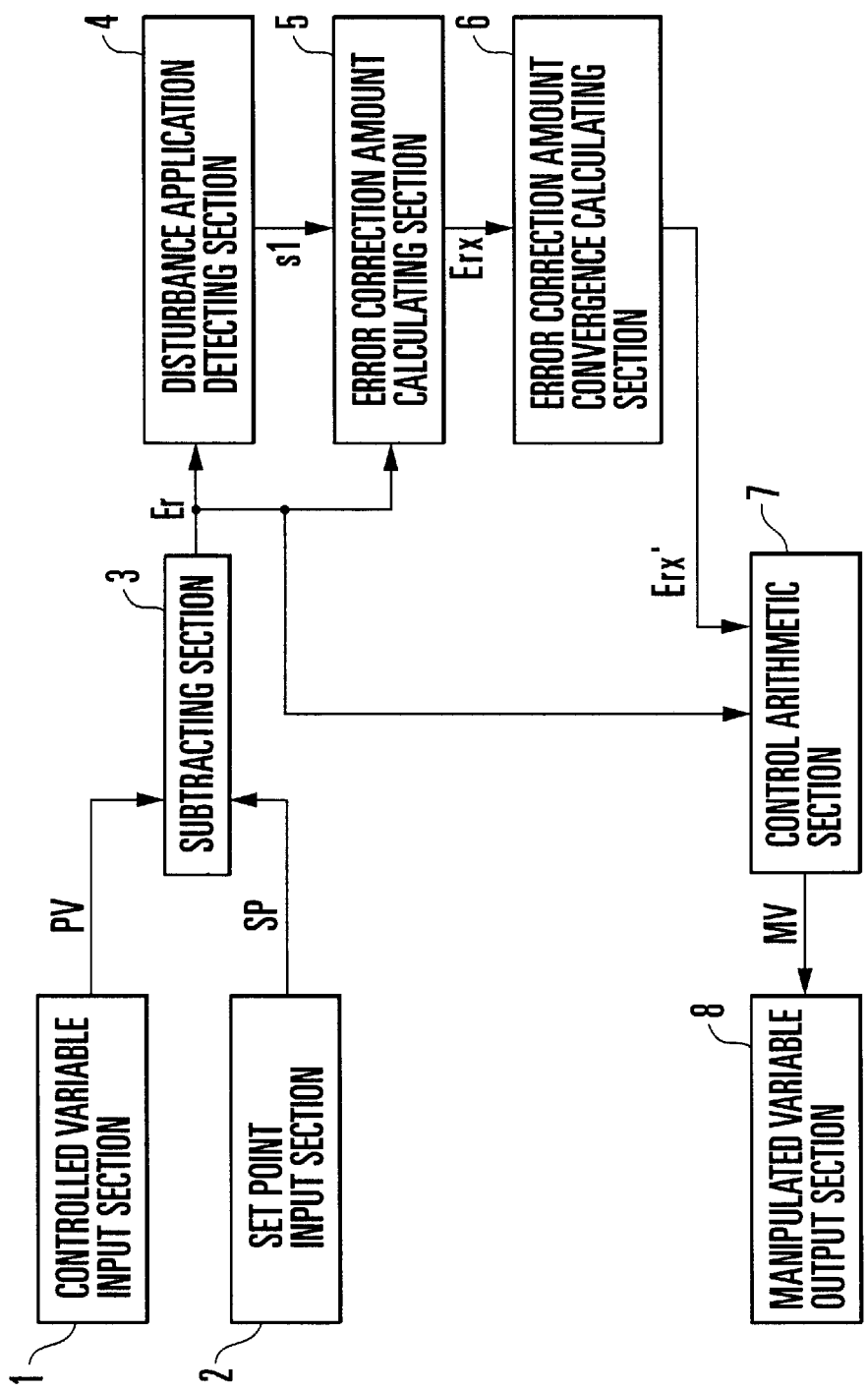
FIG. 1 is a block diagram showing a PID control arithmetic apparatus according to an embodiment of the present invention.

FIG. 1 shows a PID control arithmetic apparatus according to an embodiment of the present invention. As shown in FIG. 1, the PID control arithmetic apparatus of this embodiment is comprised of a controlled variable input section 1 to which a controlled variable PV is input, a set point input section 2 to which a set point SP is input, a subtracting section 3 for calculating an error Er of the controlled variable PV (to be referred to as the error Er hereinafter) with respect to the set point SP, a disturbance application detecting section 4 for determining in control cycles on the basis of the error Er whether a disturbance is applied, and outputting an activation signal s1 in accordance with the determination result, an error correction amount calculating section 5 for calculating an error correction amount Erx on the basis of the magnitude of the error Er upon receiving the activation signal s1 representing the detection of the application of a disturbance, an error correction amount convergence calculating section 6 for performing convergence operation such that the error correction amount Erx gradually converges to 0 according to a predetermined rule, a control arithmetic section 7 for calculating a manipulated variable MV on the basis of the error Er output from the subtracting section 3 and an error correction amount Erx' after the convergence operation, and a manipulated variable output section 8 for outputting the manipulated variable MV to a controlled system.

Figure 2:
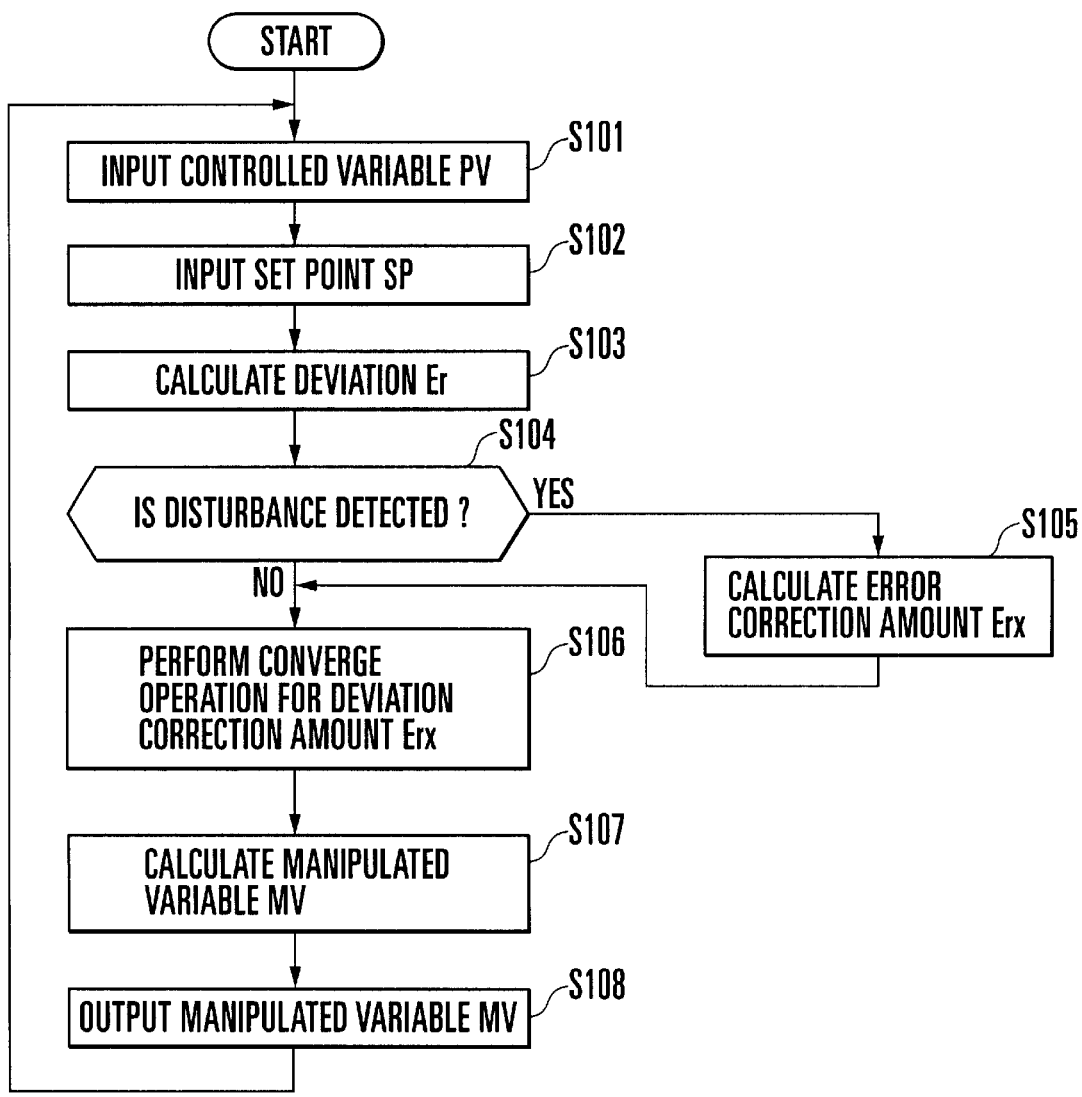
FIG. 2 is a flow chart showing the operation of the PID control arithmetic apparatus in FIG. 1.

The operation of the PID control arithmetic apparatus having the above arrangement will be described next with reference to FIG. 2.

First of all, the controlled variable PV is input from a controlled system (e.g., a sensor for detecting the controlled variable PV) to the controlled variable input section 1 serving as an interface with the outside (step S101). Meanwhile, the set point SP set by an operator is input to the set point input section 2 (step S102). The subtracting section 3 subtracts the controlled variable PV output from the controlled variable input section 1 from the set point SP output from the set point input section 2, and outputs the result as the error Er (=SP−PV) (step S103).

The disturbance application detecting section 4 determines in control cycles whether a disturbance is applied (step S104). If the disturbance application detecting section 4 determines that a disturbance is applied, the section 4 outputs the activation signal s1 to the error correction amount calculating section 5. The disturbance application detecting section 4 determines the application of a disturbance when the controlled variable PV changes in the direction to deviate from the set point SP. As described below, there are two types of situations in which the controlled variable PV deviates from the set point SP:

(I) a situation in which the error Er is a positive value, and an absolute value |Er| increases (the controlled variable PV becomes smaller than the set point SP), i.e., Er>0 and Er>Er' (Er' is an error preceding one control cycle) are satisfied; and (II) a situation in which the error Er is a negative value and the absolute value |Er| increases (the controlled variable PV becomes larger than the set point SP), i.e., Er<0 and Er<Er' are satisfied.

Wen one of situations (I) and (II) described above occurs, the disturbance application detecting section 4 determines that a disturbance is applied, and outputs the activation signal s1.

Upon receiving the activation signal s1 from the disturbance application detecting section 4, the error correction amount calculating section 5 calculates the error correction amount Erx corrected by multiplying the error Er by a predetermined coefficient, and outputs it to the error correction amount convergence calculating section 6 (step S105). The error correction amount Erx is calculated by $$Erx = Er \quad (7)$$

where $\xi$ is a constant (e.g., $\xi=0.8$).

The error correction amount convergence calculating section 6 then performs convergence operation such that the error correction amount Erx output from the error correction amount calculating section 5 gradually converges to 0 according to a predetermined rule (step S106). More specifically, the error correction amount convergence calculating section 6 calculates the error correction amount Erx' after the convergence operation according to equation (8):

$$Erx'=Erx \qquad (8)$$

where λ is a constant (0<λ<1; for example, λ=0.95). If the error correction amount Erx is not output from the error correction amount calculating section 5, the error correction amount convergence calculating section 6 performs convergence operation based on equation (8) by using the error correction amount Erx' obtained by convergence operation preceding one control cycle as the error correction amount Erx in the current control cycle. The initial value of the error correction amount Erx' (Erx) is 0.

The control arithmetic section 7 performs PID operation represented by equation (9) on the basis of the value obtained by subtracting the error correction amount Erx' after the convergence operation from the error Er to calculate the manipulated variable MV (step S107).

$$MV=C_{PID}(Er-Erx') \qquad (9)$$

$$C_{PID}=Kg\{1+(1/Tis)(1+Tds)/(1+\eta Tds) \qquad (10)$$

where Kg is the proportional gain, Ti is the integration time, Td is the differentiation time, and η is a constant (e.g., η=0.2).

The manipulated variable MV calculated by the control arithmetic section 7 is output to a controlled system, e.g., an operating unit such as a valve or heater, through the manipulated variable output section 8 serving as an interface with the outside (step S108). The control arithmetic apparatus repeats the above processing in steps S101 to S108 in control cycles until a stop command is input from an operator or the like.

Figure 3A:
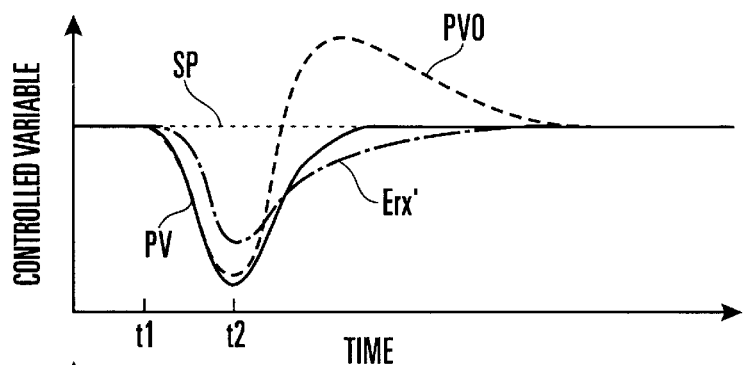
FIGS. 3A and 3B are graphs showing changes in controlled variable and manipulated variable in the PID control arithmetic apparatus in FIG. 1 and the prior art.
Figure 3B:
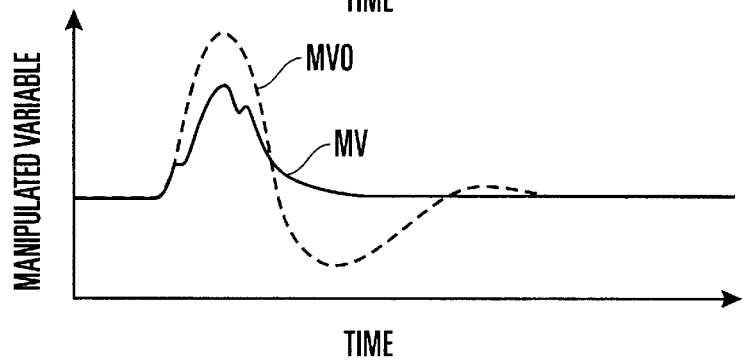

FIGS. 3A and 3B show the states of the controlled variable PV and manipulated variable MV in the PID control arithmetic apparatus described above. Referring to FIG. 3A, reference symbol PV0 denotes the controlled variable obtained by the conventional control arithmetic apparatus. Referring to FIG. 3B, reference symbol MV0 denotes the manipulated variable obtained by the conventional control arithmetic apparatus.

As shown in FIG. 3A, when a disturbance is applied at time t1, the error correction amount Erx' (Erx) is immediately calculated on the basis of the magnitude of the error Er caused by the disturbance, and the input value equivalent to the error, which is used for control operation, is corrected to a value (Er−Erx') having a small absolute value by using the calculated error correction amount Erx'. With this operation, even if a disturbance for which the controlled variable PV changes at high speed occurs, excessive manipulated variable correction can be suppressed immediately from the instant at which the disturbance is applied. As a consequence, an overshoot can be suppressed as compared with the conventional control arithmetic apparatus.

At the end of the situation in which the absolute value |Er| of the error increases upon application of the disturbance (the controlled variable PV deviates from the set point SP) (time t2 in FIG. 3A), the disturbance application detecting section 4 stops outputting the activation signal s1. With this operation, the error correction amount calculating section 5 stops calculating the error correction amount Erx, and hence the error correction amount Erx' gradually converges to 0 owing to the function of the error correction amount convergence calculating section 6. As described above, since the error correction amount Erx' is made to gradually converge to 0 instead of being abruptly restored to 0, control can be performed without any discontinuous, inappropriate control operation due to an abrupt change in the manipulated variable MV.

A point of the present invention is that a situation in which the absolute value |Er| of an error increases upon application of a disturbance is detected, and the error correction amount Erx' (Erx) is obtained by multiplying the error Er by a predetermined coefficient. The method of determining the error correction amount Erx' according to the present invention is based on the facts that a controlled system is normally approximated by linear characteristics near the specific controlled variable PV, and a general-purpose control arithmetic method such as PID control is a linear control method. This method can be used without any deterioration in the linear characteristics of a controlled system.

Figure 4A:
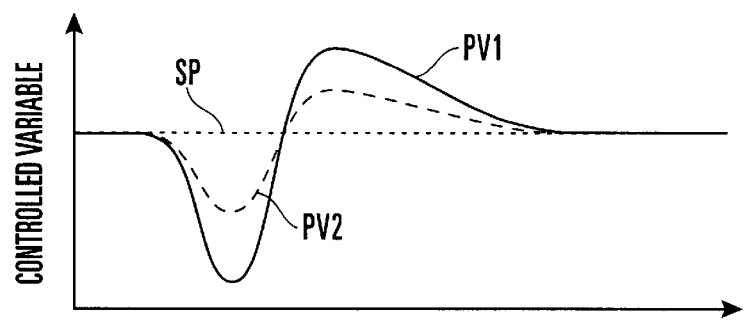
FIGS. 4A and 4B are graphs showing changes in controlled variable and manipulated variable in the PID control arithmetic apparatus in FIG. 1 and the prior art when disturbances with different magnitudes are applied.
Figure 4B:
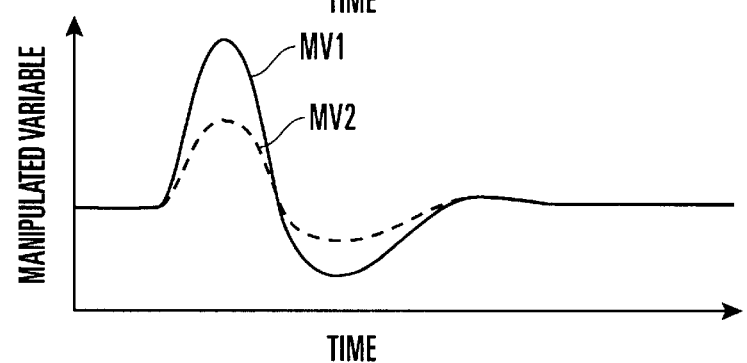
Figure 5:
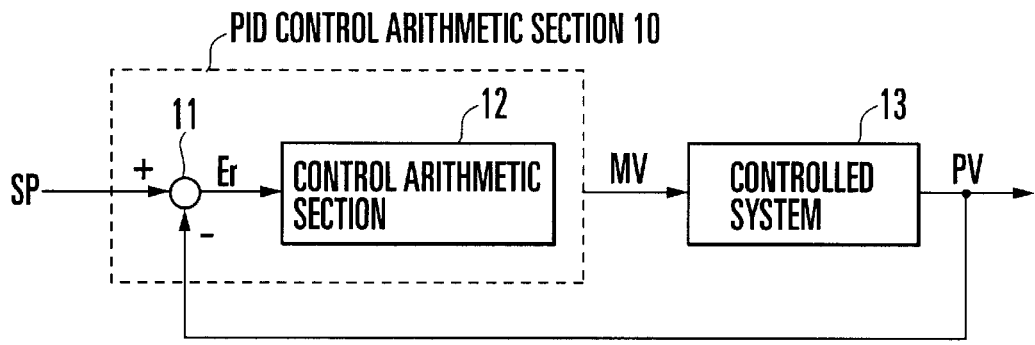
FIG. 5 is a block diagram showing a control system using the conventional PID control arithmetic apparatus.
Figure 6A:
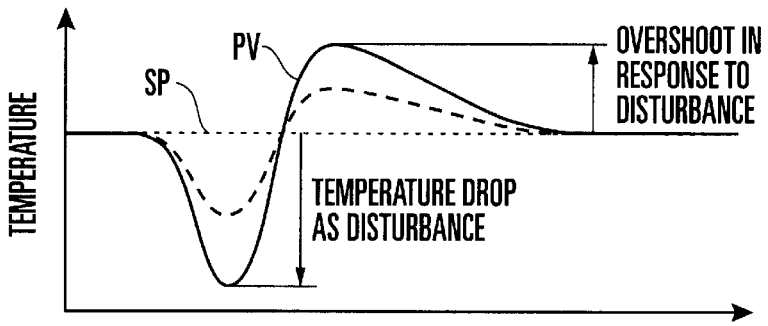
FIGS. 6A and 6B are graphs showing changes in controlled variable (temperature) and manipulated variable in a PID control arithmetic section in FIG. 5 when a disturbance like a temporary drop in temperature is applied.
Figure 6B:
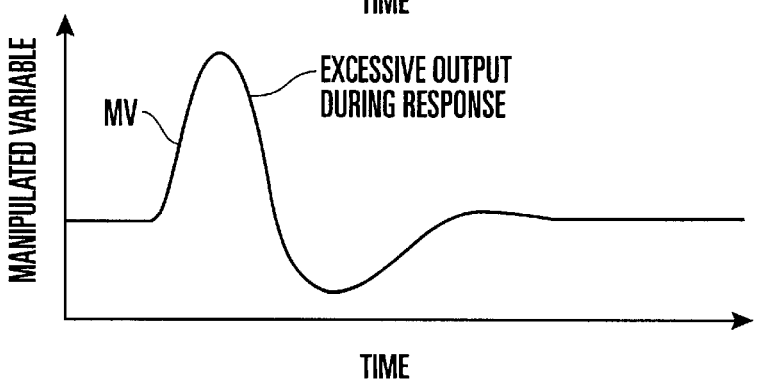
Figure 7:
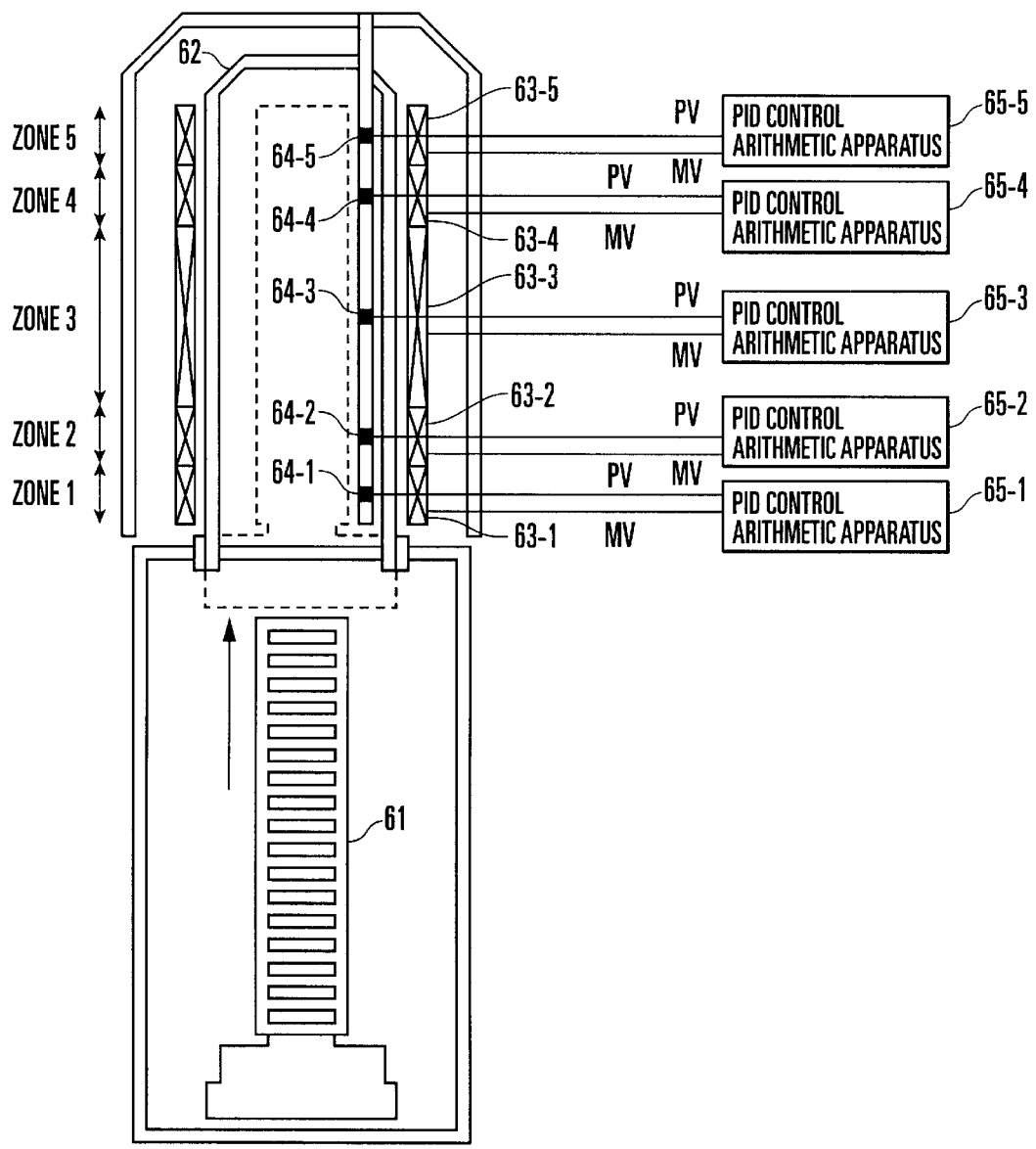
FIG. 7 is a sectional view showing a batch type CVD furnace.
Figure 8A:
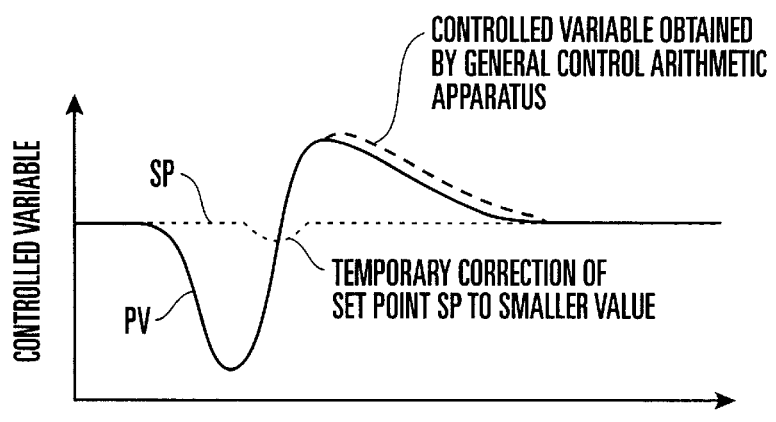
FIGS. 8A and 8B are graphs showing changes in controlled variable and manipulated variable in the conventional control arithmetic apparatus having the overshoot suppressing function.
Figure 8B:
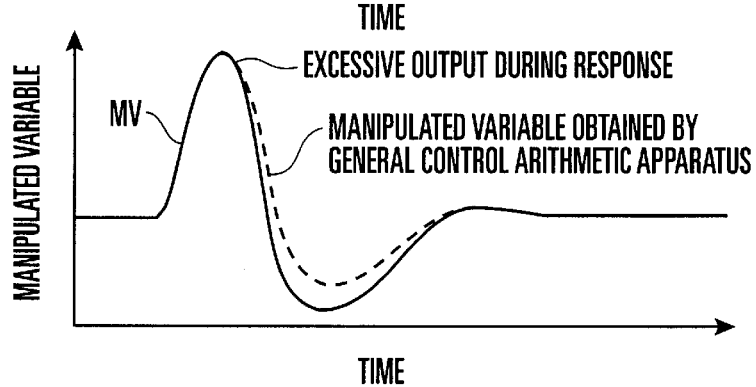

When disturbances appear in an actual controlled system capable of linear approximation as in temperature control, the error Er varies in magnitude in many cases, as shown in FIGS. 4A and 4B. In contrast to this, the disturbance application time and restoration time do not vary much because of the linear characteristics. Referring to FIGS. 4A and 4B, reference symbols MV1 and PV1 respectively denote a manipulated variable and controlled variable in case 1 associated with the conventional control arithmetic apparatus; and MV2 and PV2, a manipulated variable and controlled variable in case 2 associated with the conventional control arithmetic apparatus.

According to the control arithmetic apparatus of the present invention, the numerical values of the above constants ξ and λ remain the same with respect to disturbances with different magnitudes like those shown in FIGS. 4A and 4B, and hence an overshoot suppressing effect appropriately works. By determining the appropriate numerical values of the constants ξ and λ unique to a controlled system, therefore, an overshoot suppressing function that requires no frequent change in numerical value and hence is excellent in operability can be implemented.

In this embodiment, the input value equivalent to the error used for control operation is corrected to (Er−Erx') as indicated by equation (9). However, since the error Er is calculated by (SP−PV), error correction performed in this embodiment is substantially represented by (SP−PV−Erx'). This function therefore amounts to set point correction represented by {(SP−Erx')−PV} or controlled variable correction represented by {SP−(PV+Erx')}.

In this embodiment, the present invention is applied to PID control. Obviously, however, the present invention is not limited to this and can be applied to IMC control. In this case, the control arithmetic section 7 performs IMC operation instead of PID operation.

According to the present invention described above, in a control arithmetic apparatus for performing PID/IMC control or the like to calculate a manipulated variable on the basis of the error of a controlled variable with respect to a set point, when the application of a disturbance is detected from an increase in the absolute value of an error, an error correction amount is calculated on the basis of the magnitude of the error, and a manipulated variable is calculated on the basis of the error and error correction amount. With this operation, even if a disturbance for which the change speed of a controlled variable is too high to obtain a good result by the conventional overshoot suppressing function is applied, an overshoot can be automatically suppressed. In addition, since an error correction amount is made to gradually converge to 0 according to a predetermined rule, control can be performed without any discontinuous, inappropriate control operation due to an abrupt change in manipulated variable.

What is claimed is:

1. A control arithmetic apparatus comprising:

first calculation means for calculating an error of a controlled variable on the basis of a controlled variable and set point for a controlled system;

detection means for detecting, in control cycles, on the basis of the error output from said first calculation means whether a disturbance is applied;

second calculation means for calculating an error correction amount on the basis of a magnitude of the error output from said first calculation means when application of a disturbance is detected;

convergence operation means for performing convergence operation such that the error correction amount output from said error correction amount calculation means gradually converges to 0; and control arithmetic means for calculating a manipulated variable on the basis of the error output from said first calculation means and an error correction amount after the convergence operation which is output from said convergence operation means, wherein overshoot suppression processing is performed without depending on an adjustment of a proportional plus integral plus derivation (PID) parameter.

2. An apparatus according to claim 1, wherein said first calculation means comprises subtraction means for calculating an error by subtracting a controlled variable of the controlled system from a set point.

3. An apparatus according to claim 1, wherein said disturbance application detection means detects application of a disturbance when an absolute value of the error output from said first calculation means increases.

4. An apparatus according to claim 3, wherein said disturbance application detection means detects application of a disturbance if Er>0 and Er>Er' where Er is an error and Er' is an error preceding one control cycle.

5. A apparatus according to claim 3, wherein said disturbance application detection means detects application of a disturbance if Er<0 and Er<Er' where Er is an error and Er' is an error preceding one control cycle.

6. An apparatus according to claim 1, wherein said second calculation means calculates an error correction amount by multiplying the error output from said first calculation means by a predetermined coefficient.

7. An apparatus according to claim 1, wherein said control arithmetic means performs one of PID (Proportional, Integrational and Differential) operation and IMC (Internal Model Control) operation.

8. An apparatus according to claim 1, wherein said apparatus further comprises;

controlled variable input means to which a controlled variable of a controlled system is input; and set point input means to which a set point is input, and said first calculation means calculates an error of a controlled variable by using the controlled variable for the controlled system which is output from said controlled variable input means and the set point output from said set point input means.

9. An control arithmetic method comprising the steps of:

calculating an error of a controlled variable on the basis of a controlled variable and set point for a controlled system;

detecting, in control cycles, on the basis of the calculated error whether a disturbance is applied;

calculating an error correction amount on the basis of a magnitude of the calculated error when application of a disturbance is detected;

performing convergence operation to make the calculated error correction amount gradually converge to 0 according to a predetermined rule;

calculating a manipulated variable on the basis of the calculated error and an error correction amount after the convergence operation, and outputting the manipulated variable to the controlled system, performing overshoot suppression processing without depending on an adjustment of a proportional plus integral plus derivation (PID) parameter.

10. A method according to claim 9, wherein the step of calculating the error comprises the step of calculating the error by subtracting the controlled variable of the controlled system from the set point.

11. A method according to claim 9, wherein the step of detecting the application of the disturbance comprises the step of detecting the application of the disturbance when an absolute value of the calculated error increases.

12. A method according to claim 11, wherein the step of detecting application of the disturbance comprises the step of detecting application of a disturbance if Er>0 and Er>Er' where Er is an error and Er' is an error preceding one control cycle.

13. A method according to claim 11, wherein the step of detecting application of the disturbance comprises the step of detecting application of a disturbance if Er<0 and Er<Er' where Er is an error and Er' is an error preceding one control cycle.

14. A method according to claim 9, wherein the step of calculating the error correction amount comprises the step of calculating an error correction amount by multiplying a calculated error by a predetermined coefficient.

15. A method according to claim 9, wherein the step of calculating the manipulated variable comprises the step of calculating a manipulated variable of performing one of PID (Proportional, Integrational and Differential) operation and IMC (Internal Model Control) operation.

16. A method according to claim 9, wherein the method further comprises the steps of:

inputting a controlled variable for a controlled system; and inputting a set point, and the step of calculating the error comprises the step of calculating an error of a controlled variable by using the input controlled variable and input set point of the controlled system.

* * * * *